United States Patent Office 2,717,197
Patented Sept. 6, 1955

2,717,197
COMPLEX FLUORIDE SALTS OF TITANIUM

Gerald Taylor Brown, St. Helens, England, assignor to Peter Spence and Sons Limited, Widnes, Lancashire, England, a British company No Drawing. Application January 18, 1954, Serial No. 404,779

Claims priority, application Great Britain January 26, 1953

2 Claims. (Cl. 23—88)

This invention relates to complex fluoride salts of titanium and to their preparation.

The main difficulties encountered in the preparation of complex fluoride salts of titanium, suitable for the production of pure titanium metal by electrolytic means, are firstly the presence of contaminating elements such as iron, silicon and zirconium in the raw materials and secondly, the slow rate of dissolution of titanium ores in hydrofluoric acid.

An object of the invention is to provide a novel method of preparing complex fluoride salts of titanium aimed at avoiding the above difficulties.

According to the present invention, a process for preparing a complex fluoride salt comprises reacting aqueous titanium fluoride, or an aqueous mixture of titanium tetrachloride and hydrofluoric acid, with a water-soluble fluoride.

In one form of the invention the fluoride is a water-soluble alkali-metal fluoride such as sodium or potassium fluoride. Either the normal or the acid fluoride salt may be employed, e. g., KF or $KHF_2$.

In a preferred form of the invention, potassium fluoride is added to an aqueous solution of hydrofluoric acid, and titanium tetrachloride added to the resultant mixture whereby crystalline potassium fluotitanate $K_2TiF_6$ separates out. Alternatively, the titanium tetrachloride may be added before the potassium fluoride, and the latter may then be added in aqueous solution.

The rate of reaction of the titanium tetrachloride and hydrofluoric acid solution depends upon the rate of mixing. Since the reaction is exothermic, it may be carried out in a water cooled reaction vessel, and the rate of addition of titanium tetrachloride to the hydrofluoric acid solution controlled to maintain a workable temperature, preferably within the limits 15° and 40° C.

Alternatively, by using dilute solutions the heat capacity of the system is increased to a degree such that the maximum working temperature reached does not exceed 70° C. The use of dilute solutions requires addition of potassium fluoride, in excess of theoretical requirements.

The titanium tetrachloride employed in the reaction may be conveniently prepared by chlorination of a rutile-carbon mixture, certain impurities in the product being removed by selective condensation of the chloride vapours. Impurities remaining in the tetrachloride are iron, vanadium and silicon.

The invention will now be further described in the following examples which are given by way of illustration of specific embodiments of the invention.

Example 1

To 520 mls. of 60% commercial hydrofluoric acid dissolved in 1,000 mls. of water in a reaction vessel having a fluoride resistant lining, such as graphite, lead or plastic, 580 grams of potassium fluoride were added, with stirring, until complete dissolution was achieved. 560 mls. of titanium tetrachloride were then added slowly, and with stirring, to the mixture. The reaction products were allowed to cool to room temperature, and the finely crystalline potassium fluotitanate $K_2TiF_6$ was filtered off. After recrystallisation from water the potassium fluotitanate was dried below 250° C. The yield was approximately 90% of the theoretical, and the purity of the product, as determined by the titanium content, was 98.5–99.5%.

By re-use of the mother liquor from which the fluotitanate was obtained, the yield may be increased still further.

Example 2

12 kilos of potassium fluoride were dissolved in 70 litres of water and to the resultant solution were added 3,750 mls. of 60% commercial hydrogen fluoride. 4,050 mls. of anhydrous titanium tetrachloride were then added to the solution, with constant agitation. A maximum temperature of 70° C. was reached without the use of cooling coils. The solution was allowed to cool to room temperature and the finely crystalline potassium fluotitanate $K_2TiF_6$ filtered off. This product was washed with water and dried below 250° C. The yield was approximately 90% of the theoretical and the purity of the product, as determined by the titanium content, was over 99%.

By re-use of the mother liquor from which the fluotitanate was obtained, the yield may be increased still further.

Example 3

375 mls. of 60% hydrogen fluoride were added to 2 litres of water contained in a plastic vessel. To this 405 mls. of titanium tetrachloride were added with stirring. 1,200 gms. of potassium fluoride, dissolved in 5 litres of water were run into the resulting solution with vigorous agitation, the addition occupying approximately one hour.

The product was allowed to cool, with stirring, and when cold, was filtered. The solid potassium fluotitanate $K_2TiF_6$, was washed with cold water and dried at a temperature not exceeding 250° C.

While it is preferred to prepare the fluotitanate by reacting an aqueous mixture of titanium tetrachloride and hydrofluoric acid with the water-soluble alkali metal fluoride, it is possible to react the water-soluble alkali-metal fluoride with aqueous titanium fluoride to produce the complex salt. The latter process has disadvantages compared with the preferred process in that if the titanium fluoride solution is prepared by dissolving titanium dioxide in hydrofluoric acid solution, the oxide must be pure to ensure purity of fluotitanate, and any oxycompounds formed must be filtered off.

While fluotitanates other than the potassium salt may be prepared by the process according to the invention, potassium fluotitanate is preferred owing to the high yields which may be obtained. Sodium, lithium and ammonium fluotitanates are more soluble in cold water than the potassium salt, although sodium fluotitanate may be precipitated from aqueous solution by addition of alcohol. Sodium fluotitanate however shows a tendency to form acid double salts while ammonium fluotitanate is unstable to heat.

I claim:

1. A process for preparing potassium fluotitanate, $K_2TiF_6$, which comprises adding potassium fluoride to an aqueous solution of hydrofluoric acid, adding titanium tetrachloride to the resultant solution, and thereafter crystallising potassium fluotitanate from the solution.

2. A process for preparing potassium fluotitanate, $K_2TiF_6$, which comprises mixing an aqueous solution of potassium fluoride with an aqueous solution of hydrofluoric acid, adding titanium tetrachloride to the resultant solution, and thereafter crystallising potassium fluotitanate from the solution.

References Cited in the file of this patent

UNITED STATES PATENTS

| | | |
|---|---|---|
| 2,042,436 | Svendsen | May 26, 1936 |
| 2,475,287 | Kawecki | July 5, 1949 |
| 2,500,792 | Blythe et al. | Mar. 14, 1950 |
| 2,568,341 | Kawecki | Sept. 18, 1951 |
| 2,577,130 | Kawecki | Dec. 4, 1951 |
| 2,672,399 | Wainer et al. | Mar. 16, 1954 |

FOREIGN PATENTS

| | | |
|---|---|---|
| 574,832 | Great Britain | Jan. 22, 1946 |

OTHER REFERENCES

J. W. Mellor's, "A Comprehensive Treatise on Inorganic and Theoretical Chem.," vol. 7, 1927 ed., pages 66, 67, Longmans, Green and Co., N. Y.